Oct. 19, 1948.  W. G. COOK  2,451,921
ROTARY AMPLIFIER

Filed Nov. 30, 1944  2 Sheets-Sheet 1

WITNESSES:

INVENTOR
Willard G. Cook.
BY
ATTORNEY

Oct. 19, 1948.    W. G. COOK    2,451,921
ROTARY AMPLIFIER
Filed Nov. 30, 1944    2 Sheets-Sheet 2

WITNESSES:

INVENTOR
Willard G. Cook.
BY
Paul E. Friedemann
ATTORNEY

Patented Oct. 19, 1948

2,451,921

UNITED STATES PATENT OFFICE 2,451,921

ROTARY AMPLIFIER

Willard G. Cook, Wilkinsburg, Pa., assignor to Westinghouse Electric Corporation, East Pittsburgh, Pa., a corporation of Pennsylvania Application November 30, 1944, Serial No. 565,816

10 Claims. (Cl. 322—62)

My invention relates to amplifying generators of the rotary type for regulating, controlling, measuring and the like purposes where small changes in input energy are to be converted into substantially proportional changes in output energy of considerably larger magnitude.

Such amplifying generators have been used in tandem or feedback circuits, so as to obtain multi-stage amplification. With the known generators, however, such stepped-up amplification requires a plurality of tandem-connected machines, and hence a corresponding number of armatures, bearings and the like parts as well as a correspondingly large space.

It is an object of my invention to afford multi-stage amplification of high sensitivity and high speed of response by means of a single rotary machine of the dynamo type.

Another object, allied to the foregoing, is to provide an amplifying rotary generator which substantially maintains proportionality between input and output energy over an extremely wide range of control.

Still another object of my invention is to provide a generator which combines in itself the regulating and amplifying functions of a plurality of interconnected machines thus considerably reducing the space requirements.

In order to achieve these objects, and in accordance with my invention, I provide an amplifying direct-current generator with at least two field windings and two appertaining pairs of commutator brushes, and connect one of these field windings with the brushes correlated to the other winding so that one winding is energized by the armature output current controlled by the field of the other winding.

According to another feature of my invention, the two or more field windings of an amplifying generator, designed and operative as just mentioned, are arranged on different field poles so that the mutual inductance between these windings is considerably lower than that existing between field windings on a common field pole.

According to still another feature, my invention involves the provision of two or more magnetizable stator field structures, each carrying at least one field winding, which are so arranged within a single generator that the flux path in each structure is at least partly separate from that of the other structure or structures.

My invention involves also the provision of self-energized field windings, in addition to those aforementioned, in order to introduce compensating or feed-back effects for improving or modifying the characteristic of the multi-stage machine.

These and other objects and features of my invention will be apparent from the following description of the embodiments illustrated in the drawings, in which.

Figure 1:
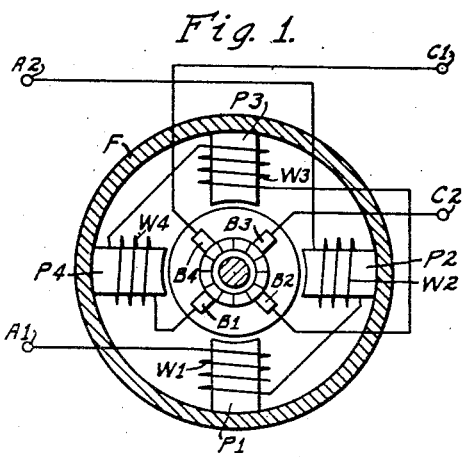
Figure 1 shows diagrammatically an amplifying generator according to the invention, operating as a double-stage amplifier.

Referring to Fig. 1, the illustrated direct-current generator has its magnetic stator or frame structure F provided with four field poles denoted by P1, P2, P3 and P4, respectively. Each pole carries a field winding W1, W2, W3, or W4. Windings W1 and W2 are connected to input terminals A1 and A2 and represent the control coils of the amplifying machine. The commutator of the machine is provided with two pairs of contact brushes B1, B2 and B3, B4, respectively. Brushes B1 and B2 have an angular position correlated to poles P1 and P2 for carrying the armature output current controlled by windings W1 and W2. Windings W3 and W4 are connected to brushes B1 and B2 and hence are energized by that output current. Brushes B3 and B4 have the proper angular position relative to poles P3 and P4 for deriving the armature output current controlled by windings W3 and W4. The output terminals of the machine C1 and C2 are connected to brushes C1 and C2, respectively. When the armature of the machine is rotating, a small input current traversing the windings W1 and W2 causes an amplified current to issue from brushes B1 and B2, and to energize the second pair of windings W3 and W4. This, in turn, causes a still further amplified current to pass from brushes B3 and B4 through terminals C1 and C2 to the load circuit (not shown) atttached between these terminals. In order to achieve substantial proportionality between changes in input and output energy, the magnetic system of the machine operates normally on the unsaturated straight portion of its magnetic characteristic and is normally driven at constant speed.

It will be understood that the customary interpole and compensating windings may be added for improving commutating conditions or correcting or modifying the behavior of the machine. One way of obtaining such a modification is to equip the machine with self-energized windings as exemplified by the embodiment represented in Fig. 2.

Figure 2:
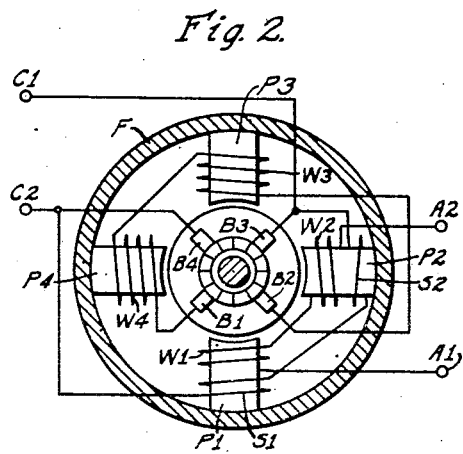
Figs. 2, 3 and 4 show diagrammatically three further modifications, respectively, of double stage amplifying machines according to the invention.

The generator according to Fig. 2 is a double stage amplifier similar to that of Fig. 1 except that poles P1 and P2 are provided with additional windings S1 and S2 which are connected across the output brushes B3 and B4 or across terminals C1 and C2. Such self-energized windings may be rated and connected for increasing the amplification factor or for compensating purposes. For instance, the energization or windings S1 and S2 may be in such a direction and proportion as to counteract or neutralize the effect of the magnetic linkage between the two sets of poles thereby reducing or substantially eliminating any loss in amplification due to such linkage.

Figure 3:
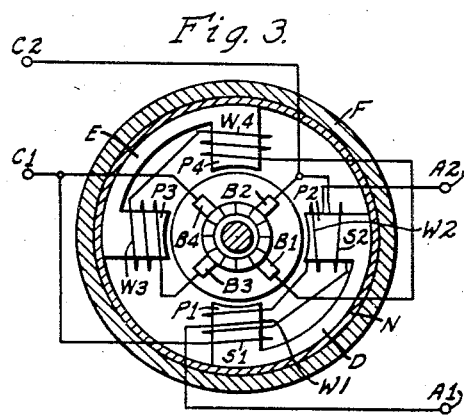

An increase in amplification can also be obtained by separating the two sets of pole structures magnetically from each other, for instance, in the manner shown in Fig. 3. The iron frame F of this machine is lined by a non-magnetic shim N which carries two separate pole structures D and E. Structure D has two poles P1 and P2, and structure E has poles P3 and P4. The four poles are provided with field windings W1, W2, W3, W4, S1 and S2 similar to those shown in Fig. 2. The appertaining two pairs of commutator brushes are denoted by B1, B2 and B3, B4, respectively.

Figure 4:
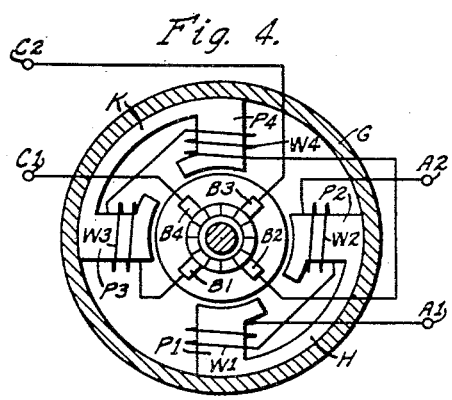

Another modification of similar type is represented in Fig. 4. The stator frame G of this machine consists of non-magnetic material such as aluminum and carries two separate magnetic field structures H and K which are provided with the pole pairs P1, P2 and P3, respectively. The field poles have pole shoes, which within each pair, extend toward each other so that the distance between the pole surfaces of each structure H or K is smaller than the distance of each structure from the other structure.

Referring to the embodiments of Figs. 3 and 4, the two magnetic field structures (such as H and K in Fig. 4) consists preferably of a material of high permeability and low remanence, for instance of the magnetically soft material known under the trade-name Hypernik. The structures are laminated and rated for operation on the straight portion of their magnetic characteristic so that, when the machine is running at substantially constant speed, the generator output, appearing across terminals C1 and C2 changes substantially in linear proportion to the input signal impressed on terminals A1 and A2. Due to the fact that the magnetic flux path within each of the two magnetic field structures is substantially free of inductive coupling with the other magnetic structure, a machine of this type affords an extremely high amplification ratio and an especially high rate of response.

It will be understood from the foregoing that the invention is not limited to double-stage amplifiers, but can also be embodied in dynamos for a larger number of amplifying stages. This is exemplified by the generator shown in Fig. 5.

Figure 5:
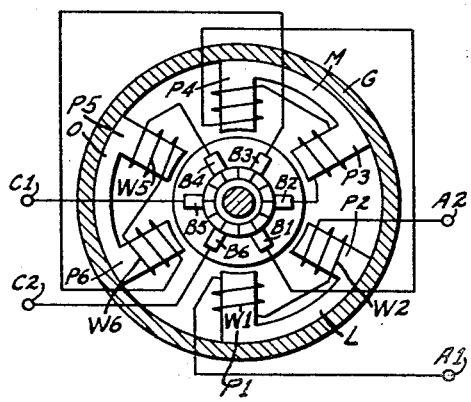
Fig. 5 is a diagrammatic representation of a generator designed as a triple-stage amplifier.

The rotary amplifier, according to Fig. 5 has three magnetic field structures L, M and O mounted on a non-magnetic frame G and acting on a single armature. The field structure L is provided with two poles P1 and P2 which carry field windings W1 and W2. These windings are connected to input terminals A1 and A2. The appertaining pair of brushes of the commutator are denoted by B1 and B2. Field structure M has two poles P3 and P4, and carries field windings W3 and W4 which are connected to the brushes B1 and B2. The brushes relating to field structure M are denoted by B3 and B4. Field structure O has two poles P5 and P6 associated with field windings W5 and W6 which are connected between the brushes B3 and B4. Two further brushes B5 and B6 appertain to field structure O and serve to carry the output energy of the last amplifier stage. Two output terminals C1 and C2 are connected to the brushes B5 and B6.

The three magnetic flux paths extending through the stationary field structures L, M and O are magnetically separate from one another to such an extent that nearly maximum triple-stage amplification is obtained between the input terminals A1, A2 and the output terminals C1 and C2.

Figure 6:
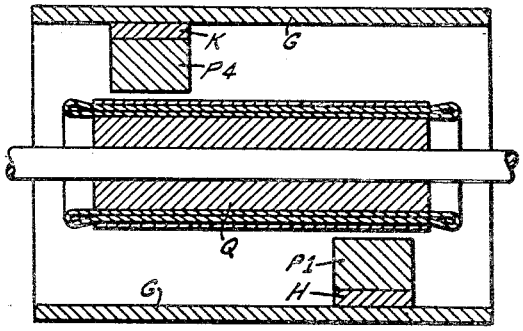
Fig. 6 represents schematically an axial section of still another embodiment of the invention, also operating as a multiple-stage amplifier.

According to Fig. 6, the armature Q and the non-magnetic frame or casing G of the illustrated generator are of elongated shape. Two field structures H and K, for instance according to Fig. 4, are mounted on the frame G and have each two poles of which only one, denoted by P1 and P4, respectively, is visible in the illustration. The two field structures are axially displaced from each other, so that their mutual inductance is negligible.

It should be understood that, in addition to the field windings described in the foregoing, a machine according to the invention may also be equipped with further windings for providing special control or regulating effects. For instance, the field structure representing the input stage of the amplifier may be provided with a plurality of control windings, so that the magnetization of the field structure is dependent on the resultant ampere turns of all these windings. An embodiment of such type is illustrated in Fig. 7, in connection with a circuit exemplifying how a generator according to the invention may be used for control and regulating purposes.

Figure 7:
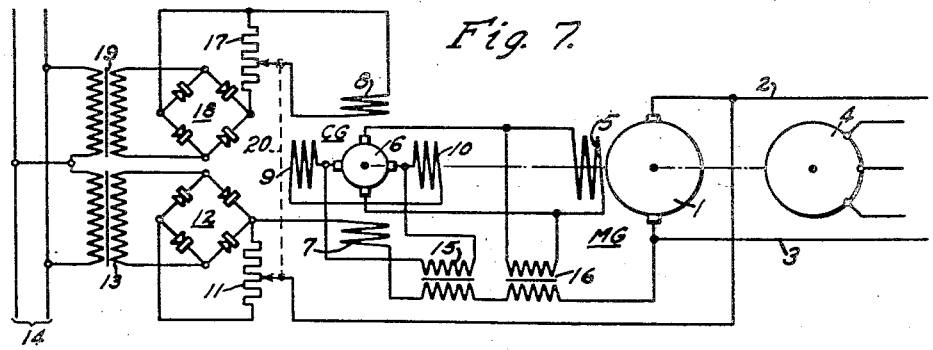
Fig. 7 shows the circuit diagram of a closed-cycle control or regulating system, in which an amplifying generator according to the invention is used for regulating and controlling the operation of a main generator.

The system represented by Fig. 7 contains a main generator MG for producing a direct-current of regulated voltage. The armature 1 of the main generator MG is connected to the mains 2 and 3 of the output or load circuit. The armature 1 is driven by a constant-speed motor 4. The armature voltage is controlled by a field winding 5 of generator MG which obtains its excitation from a control generator CG. This control generator is designed and operative in accordance with the present invention. The armature 6 of the control generator is mounted on the shaft of the main generator MG and hence rotates also at constant speed. The generator CG has four field windings denoted by 7, 8, 9 and 10. Windings 7 and 8 are mounted on one of the two pole pairs, while windings 9 and 10 are disposed on the second pole pair of the generator. Windings 9 and 10 are connected in parallel to the pair of brushes which carries the output energy controlled by the two windings 7 and 8. The second pair of brushes is connected to field winding 5 of main generator MG in order to supply thereto the amplified output current of the control generator CG.

Winding 7 is energized by a control circuit which is connected across the mains 2 and 3 of the load circuit. This circuit contains a rheostat 11 whose terminals are connected to a rectifier 12. The rectifier is energized through a constant voltage transformer 13 from an alternating-current line 14. The voltage drop across rheostat 11 is so rated that it balances the voltage across mains 2 and 3 during the steady state operating condition of the system so that winding 7 is not energized as long as the steady condition persists. The control circuit of field winding 7 contains also the secondary windings of two damping transformers 15 and 16. The primaries of these transformers are connected across the output brushes of the first amplifier stage of generator CG and across the field winding 5 of the main generator MG, respectively.

Field winding 8 of generator CG is connected to a rheostat 17 which, in turn, is traversed by a constant direct-current derived from a rectifier 18 which is connected through another constant voltage transformer 19 to the alternating-current line 14.

During the operation of the system, the output voltage of control generator CG is mainly governed by the selected excitation of field winding 8, and this excitation is determined by the setting of rheostat 17. As long as the output voltage of the main generator corresponds to this setting, no regulating effect is produced by field winding 7 because the line voltage is fully balanced by the standard voltage appearing across rheostat 11. In order to calibrate this rheostat for each setting of rheostat 17, the sliders of both rheostats are adjusted simultaneously in a given relation to each other, for instance, by means of a transmission, as schematically indicated by the broken line 20, interconnecting the two sliders. When the voltage across mains 2 and 3 changes for instance due to a load variation, this change causes a differential voltage to appear across winding 7. As a result, the winding 7 exerts a regulating effect on the control generator of the magnitude and direction necessary to restore the main generator output voltage to its desired value.

If under certain operating conditions the system may tend to overshoot the desired voltage value, and hence start hunting, such hunting can be prevented by the addition of above-mentioned damping transformers 15 and 16. Both transformers do not affect the steady state operation of the system because no voltage is induced in their secondaries as long as the output voltage of the main generator maintains the desired value. However, as soon as the control generator CG responds to changes in main generator output voltage, an impulse is induced in the secondaries of the transformers in such a direction as to reduce the tendency to overshoot. If the two amplifier stages embodied in the control generator are substantially separate from each other in inductive respect, the damping effect of such transformers is highly effective. It will be understood, however, that depending upon the conditions of the particular control system, generators according to the invention need not necessarily be provided with such damping transformers, or that only one of the damping transformers may be sufficient.

In view of the different modifications described in the foregoing, it will be obvious to those skilled in the art that rotary amplifiers according to the invention can be modified in various respects without departure from the essential features of the invention as set forth in the claims annexed hereto.

I claim as my invention:

1. An amplifying generator comprising an armature and a plurality of field structures each having poles of different respective polarities for passing magnetic flux through said armature, said structures being displaced relative to each other, so that the magnetic flux path in each of them is substantially separate from that in said other structures, separate field windings on said structures respectively, and a pair of brushes pertaining to one of said field structures and connected with said field winding of another structure for obtaining plural-stage amplification.

2. An amplifying generator comprising an armature and a plurality of field structures each having two magnetically interconnected poles of different respective polarities for passing magnetic flux through said armature, said structures being angularly displaced relative to each other, so that the flux path in each of them is substantially self-contained therein, field windings on said structures respectively, and a pair of brushes pertaining to one of said structures and connected with the field windings of another structure for obtaining plural-stage amplification.

3. An amplifying generator comprising a rotary armature, a non-magnetic frame coaxial with said armature, a plurality of field structures mounted on said frame and each having a pair of magnetically interconnected poles for passing magnetic flux through said armature, said structures being substantially separate from one another, so that the magnetic flux path of each of them is substantially fully contained therein, field windings on said structures, and a pair of brushes pertaining to one of said structures and connected with the field winding of another structure for obtaining plural-stage amplification.

4. An amplifying generator comprising an armature and a plurality of field structures each having poles for passing magnetic flux through said armature, said structures being displaced relative to each other, so that the magnetic flux path in each of them is substantially separate from that in said other structures, said poles of each structure having their armature ends extended toward each other, so that the distance of each pole from the appertaining other pole of said structure is smaller than the distance between poles of different structures, field windings on said structures respectively, and a pair of brushes pertaining to one of said structures and connected with the field winding of another structure for obtaining plural-stage amplification.

5. An amplifying generator comprising an armature and a plurality of field structures each having two magnetically interconnected poles for passing magnetic flux through said armature, said structures being angularly and axially displaced relative to each other, so that the flux path in each of them is substantially self-contained therein, field windings on said structures respectively, and a pair of brushes pertaining to one of said structures and connected with the field winding of another structure for obtaining plural-stage amplification.

6. An amplifying generator comprising an armature, a plurality of field structures each having magnetically interconnected poles for passing magnetic flux through said armature, said structures being angularly displaced from each other, so that the flux paths in said respective structures are substantially separate from one another, a plurality of field windings on said structures respectively, a plurality of pairs of armature brushes pertaining to said respective field structures, one of said field windings being provided with input terminals and the appertaining pair of brushes being connected with another one of said field windings, and another pair of said brushes being provided with output terminals.

7. An amplifying generator comprising a nonmagnetic frame and an armature coaxial therewith, two field structures mounted on said frame and angularly displaced relative to each other, each of said structures having two magnetically interconnected poles, field windings disposed on said structures respectively, two pairs of armature brushes located relative to said brushes to carry the armature output currents corresponding to said structures respectively, input terminals for said field winding of one of said structures, said pair of brushes pertaining to said one structure being connected to the field winding of said other structure, and output terminals connected to said other pair of brushes.

8. A direct-current generator comprising an armature having a commutator, a plurality of field structures each having magnetically interconnected poles for passing magnetic flux through said armature, said structures being angularly displaced from each other, so that the flux paths in said respective structures are substantially separate from one another, a plurality of field windings disposed on one of said structures, so that its magnetization is due to the resultant effect of said windings, another field winding disposed on another field structure, a plurality of pairs of contact brushes engaging said commutator and pertaining to said respective field structures, said other field winding being connected to the pair of brushes pertaining to said one structure.

9. An amplifying generator, comprising an unsaturated field structure provided with a plurality of pole pairs and an armature having a commutator with a plurality of pairs of brushes correlated to said respective pole pairs, control winding means disposed on a first one of said pole pairs, terminals connected to said control winding means for providing control excitation, field windings disposed on a second one of said pole pairs and connected across the one of said brush pairs which is correlated to said first pole pair so that said field windings are energized by voltage generated in said armature under control by said control winding means for causing said armature to generate amplified output voltage between a pair of said brushes that is correlated to said second field poles, an output circuit connected to said latter pair of brushes, and a feed-back field winding connected with said output circuit and disposed on the poles of at least one of said pole pairs.

10. An amplifying generator comprising an unsaturated field structure provided with a plurality of pole pairs and an armature having a commutator with a plurality of pairs of brushes correlated to said respective pole pairs, control winding means disposed on a first one of said pole pairs, input terminals connected to said control winding means for providing control excitation, field windings disposed on a second one of said pole pairs and connected across the one of said brush pairs which is correlated to said first pole pair so that said field windings are energized by voltage generated in said armature under control by said control winding means for causing said armature to generate amplified output voltage between a pair of said brushes that is correlated to said second field poles, output terminals connected to said latter pair of brushes, and a feed-back field winding connected across said output terminals and disposed on said first pole pair.

WILLARD G. COOK.

REFERENCES CITED

The following references are of record in the file of this patent:

UNITED STATES PATENTS

| Number | Name | Date |
|---|---|---|
| 931,336 | Osnos | Aug. 17, 1909 |
| 2,000,699 | Harding | May 7, 1935 |